United States Patent [19]

Moake

[11] Patent Number: 5,525,797
[45] Date of Patent: Jun. 11, 1996

[54] FORMATION DENSITY TOOL FOR USE IN CASED AND OPEN HOLES

[75] Inventor: Gordon L. Moake, Houston, Tex.

[73] Assignee: Gas Research Institute, Chicago, Ill.

[21] Appl. No.: 327,069

[22] Filed: Oct. 21, 1994

[51] Int. Cl.[6] .............................. G01V 5/08; G01V 5/12
[52] U.S. Cl. .................................. 250/269.3; 250/269.2; 250/264; 250/265; 250/266
[58] Field of Search .......................... 250/269.3, 269.2, 250/264, 266, 265

[56] References Cited

U.S. PATENT DOCUMENTS

| | | | |
|---|---|---|---|
| 3,038,075 | 6/1962 | Youmans | 250/83.3 |
| 3,389,257 | 6/1968 | Caldwell et al. | 250/256 |
| 4,596,926 | 6/1986 | Coope | 250/265 |
| 4,685,092 | 8/1987 | Dumont | 367/35 |
| 4,698,501 | 10/1987 | Paske | 250/265 |
| 4,705,944 | 11/1987 | Coope | 250/254 |
| 4,864,129 | 9/1989 | Paske et al. | 250/269 |
| 4,894,534 | 1/1990 | Paske et al. | 250/254 |
| 5,081,391 | 1/1992 | Owen | 310/334 |
| 5,089,989 | 2/1992 | Schmidt et al. | 367/35 |
| 5,091,644 | 2/1992 | Minette | 250/254 |
| 5,184,692 | 2/1993 | Moriarty | 175/50 |
| 5,250,806 | 10/1993 | Rhein-Knudsen et al. | 250/254 |
| 5,377,160 | 12/1994 | Tello et al. | 367/35 |
| 5,390,115 | 2/1995 | Case et al. | 364/422 |

OTHER PUBLICATIONS

SPE 28407; High-Resolution Density Logging Using a Three Detector Device; K. A. Eyl, et al.; Copyright 1994, Society of Petroleum Engineers, Inc. presented Annual Technical Conference, New Orleans (Sep. 1994).

Primary Examiner—Constantine Hannaher
Assistant Examiner—Virgil O. Tyler
Attorney, Agent, or Firm—Baker & McKenzie

[57] ABSTRACT

An improved formation density logging tool is provided that is effective in cased holes. The improved tool utilizes three detectors: a first detector for primarily compensating for the casing; a second detector for primarily compensating for the cement; and a third detector for providing formation information. The tool provides an improvement over currently-available two-detector density tools which are normally useful only in open holes. It is anticipated that the tool provided herein will be useful in both open and cased holes.

16 Claims, 3 Drawing Sheets

FORMATION DENSITY TOOL FOR USE IN CASED AND OPEN HOLES

FIELD OF THE INVENTION

This invention relates generally to oil and gas well logging tools. More particularly, this invention relates tools for measuring rock formation density through the use of gamma rays. Still more particularly, this invention relates to an improved density tool that may be used in cased holes as well as open holes.

BACKGROUND AND SUMMARY OF THE INVENTION

Logging tools for measuring the formation density in open holes are well known. Currently-available "open-hole" density logging tools normally include a gamma ray source, typically cesium-137, and two detectors—a near detector and a far detector. Open-hole density tools have two detectors to compensate for mudcake (i.e. a layer of solid material consolidated from drilling fluid that normally lines an open borehole) and standoff (i.e. the distance between the tool and the side of the borehole). Gamma rays are continuously emitted from the source and propagate out through the mudcake and into the formation. The electron density of the formation is calculated based on the count rate or intensity of the gamma rays that are received at the detectors after passing through the mudcake and formation.

In addition to employing radioactive sources for gamma rays, it is anticipated that density tools will employ accelerators, or more specifically electron accelerators, as gamma ray sources even though such accelerators are not currently available. In tools employing accelerators, the detectors will not necessarily detect and/or calculate gamma ray count rates because most accelerator designs generate relatively huge amounts of gamma rays for brief, intermittent periods of time resulting in large quantities of gamma rays engaging the detectors within a relatively short period of time. Therefore, it may be more feasible to detect and measure the intensities of the gamma rays rather than the count rate or the rate at which gamma rays engage the detectors. The detectors would generate voltage signals proportional to the intensities of the detected gamma rays as opposed to count rate signals.

In general, a layer of mudcake exists along the outer periphery of the borehole. The intensity signals from the near and far detectors are combined to provide a measure of the formation density that is essentially independent of this mudcake if the thickness of the mudcake is within a limited range. This is possible when the spacings and collimations chosen for the two detectors result in substantially different sensitivities to the mudcake and formation. The thickness of the mudcake that can be compensated for is limited by the spacing between the near detector and the gamma ray source and by the collimation of the near detector. A longer spacing between the gamma ray source and the near detector enables more mudcake to be penetrated by the gamma rays and therefore enables the tool to compensate for thicker mudcake. However, greater spacings between the gamma ray source and the near detector reduce the contrast between the near and far detector sensitivities to mudcake and the formation, thereby reducing the quality of the density measurement.

However, these two-detector density logging tools are limited in their use in that they are unable to provide an accurate formation density when used in a cased hole. Specifically, while the currently-available two detector density tools can compensate for mudcake, they are unable to compensate for the casing and cement and are therefore unable to accurately calculate the formation density in a cased hole.

The gamma ray detectors consist of sodium iodide crystals connected to photomultiplier tubes. These devices are commercially available and well known in the art. When gamma rays interact in the sodium iodide crystal, they produce light which is converted by the photomultiplier tube into an electronic signal. These signals are amplified to produce voltage pulses that are proportional to the energy deposited in the crystal. These voltage pulses may be counted to determine the gross number of gamma rays detected per second or they may be sorted by amplitude to determine the number of gamma rays detected per second in various energy ranges. The later technique is common in open-hole logging, as described in the paper "A New Approach to Determining Compensated Density and $P_e$ Values with a Spectra-Density Tool", presented by G. L. Moake at the Annual SPWLA Logging Symposium in Midland, Jun. 16–19, 1991.

Typical two detector density tools are decentralized with a bowspring or caliper device so that the detectors and the source are pushed up against the side of the borehole. The decentralization of the tool against the side of the borehole substantially precludes the gamma rays from propagating upward through the drilling fluid and therefore the effect of the drilling fluid on the density measurement is minimized.

However, as noted above, the two detector density tools cannot adequately function in cased holes because they are unable to compensate for the casing and the cement. In short, too many variables are present in order to accurately calculate the formation density. Specifically, in order to probe the formation, the gamma rays must exit the tool, pass through the casing and cement and scatter in the formation before passing back through the cement and the casing to finally reenter the tool to be detected. Thus, instead of just a mudcake correction as in the case of open holes, a cased hole density tool must be able to correct or compensate for the cement and casing which are both more formidable a correction than a layer of mudcake because of the relatively high densities of metal casing and thick amounts of cement (i.e. fewer gamma rays are able to penetrate the casing and cement to reach the near detector).

Occasionally, open hole density tools are used to run cased hole density logs. The information provided by open hole density tools in cased holes is accurate in only a limited number of cases, primarily when the cement thickness is quite small or no cement is present. This can occur on the low side of deviated wells where the casing may very well be resting against bare formation or only a small amount of cement will be disposed behind a casing. Typically, open hole density tools employ a gamma source in the form of contained cesium-137 which produces 0.662 MeV gamma rays. The amount of cement that can be corrected for is limited by the near or "first" detector. Typically, these near detectors can correct for only about 0.75 inches of mudcake in an open hole and therefore it is easy to see why these tools are ineffective in compensating for steel casing, which is normally 0.36 to 0.50 inches thick in combination with a layer of cement disposed behind the casing. In any event, even dangerously thin casing is much denser, and therefore more effective at blocking the passage of gamma rays, than mudcake.

As the gamma rays pass through the casing, cement and formation, they are scattered and absorbed by these materials. The primary scattering interaction is called Compton scattering and is caused by electrons in the casing, cement and formation. Compton scattering tends to reduce the energy of the gamma rays that are scattered until their energy is so low that the gamma rays are absorbed by electrons through an interaction called photoelectric absorption. Thus, if the density of electrons in the casing, cement and formation is high, fewer electrons will make it back through the formation, cement and casing to be detected in the tool. In short, the number of detected gamma rays varies inversely to the density of electrons in the various materials through which the gamma rays must pass. Since the density of electrons is directly related to the density of the material being measured, the number of detected gamma rays will also depend strongly on the density of the casing, the density of the cement and the density of the formation.

Two other physical processes that dominate the scattering and absorption of gamma rays are known as coherent scattering and photoelectric absorption, both of which are highly dependent upon the composition of the material. Those skilled in the art commonly represent the strength or effect of the coherent scattering and photoelectric absorption interactions relative to the strength of Compton scattering with the variable $P_e$. Thus, the amount of gamma rays detected at the tool will also depend on the $P_e$ of the casing, the $P_e$ of the cement and the $P_e$ of the formation. Of course, the detected gamma rays will also depend on the thickness of the casing and the thickness of the cement.

As stated above, the performance of the tool will also depend slightly upon the density of the borehole fluid. However, density tools are commonly decentralized in the borehole, meaning that the tool, including the source and detectors is pushed up against the side of the borehole. In that manner, there is very little borehole fluid through which the gamma rays must pass in order to be detected at the tool. Further, since the borehole fluid properties are usually known and in any event can be tested at the surface, small correction factors based on the knowledge of the borehole fluid properties can be easily utilized.

Accordingly, there are eight variables that affect the response of the tool: the density of the casing $(\rho_s)$; the thickness of the casing $(t_s)$; the $P_e$ of the casing; the density of the cement $(\rho_c)$; the $P_e$ of the cement; the thickness of the cement $(t_c)$; the formation density $(\rho_f)$; and the $P_e$ of the formation. However, all but three independent combinations of variables can be accounted for prior to measurement.

First, casings tend to be made of the same material, namely carbon steel. Therefore, casings tend to have about the same density $(\rho_s)$ and $P_e$. Thus the density and $P_e$ of the casing are known.

Second, the $P_e$ of most cements is a negligible value because the low energy gamma rays that are sensitive to the $P_e$ of the cement are blocked by photoelectric absorption that occurs within the casing. Accordingly, only the density and thickness of the cement are important. Further, the variations in the intensity signal of detected gamma rays at the tool due to the presence of cement behind the casing can be thought of as changes to the intensity signal that would be obtained where no cement is present at all. The cement can be thought of as a local substitution for formation. That is, it is reasonable to expect the intensity signal to vary with the difference between the formation density and the cement density as well as with the cement thickness. If either the contrast in the densities of formation and cement or the cement thickness is zero, then the effect of the cement is also zero. Therefore, the effect of the cement on the detected intensities at the tool will depend primarily on the following expression:

$$(\rho_f - \rho_c) t_c$$

where $\rho_f$ is the formation density, $\rho_c$ is the cement density and $t_c$ is the cement thickness. The expression $(\rho_f - \rho_c) t_c$ can be treated as one variable. Similarly, the effect of the casing on the detected intensities at the tool will be proportional to the following expression which also can be treated as one variable:

$$(\rho_f - \rho_s) t_s$$

where $\rho_s$ is the density of the casing, $t_s$ is the thickness of the casing and $\rho_f$ is the formation density.

Further, the $P_e$ of the formation can also be neglected because $P_e$ is a much lower value for high energy gamma rays than for low energy gamma rays. In other words, the effect of coherent scattering and photoelectric absorption is very low for high energy gamma rays; in contrast, the effect of coherent scattering and photoelectric absorption is relatively significant for low energy gamma rays. However, any gamma rays that become low energy gamma rays in the formation are unlikely to penetrate the cement and casing before being detected by the tool. Thus, the measured intensity at the tool will not depend significantly on the $P_e$ of the formation.

Therefore, in light of the above, there are only three independent variables that significantly affect the measured intensities: the density of the formation $(\rho_f)$; $(\rho_f - \rho_c) t_c$; and $(\rho_f - \rho_s) t_s$. Because there are three unknown variables, three independent intensities must be measured in order to determine the formation density in a cased hole. Further, assuming a casing density $(\rho_s)$ and a cement density $(\rho_c)$, one can calculate the casing thickness $(t_s)$ and cement thickness $(t_c)$ respectively.

Accordingly, it would be highly desirable to provide a density logging tool with at least three detectors that would be capable of measuring the formation density in a cased hole as well as cement thickness and casing thickness. An effective cased hole density logging tool in combination with already existing cased hole neutron logging tools would provide an effective means for finding additional gas reserves behind existing cased holes. Further, an effective cased hole density tool would also provide important information regarding formation evaluation behind the casing. It is further contemplated that an improved cased hole density logging tool could also prove useful in open holes.

An improved tool for measuring formation density in cased or open holes is provided in the form of a housing that accommodates a gamma ray source and at least three detectors. The gamma ray source is spaced axially from the first, second and third detectors. The first or near detector is axially spaced from the gamma ray source by a distance defined as a first spacing. The first spacing and collimation for the first detector are designed so that the gamma rays detected at the first detector are those gamma rays that are scattered primarily by the casing. In short, the first detector primarily detects or preferentially detects gamma rays scattered through the casing.

A second or middle detector is spaced axially farther away from gamma ray source than the first detector. The second detector is spaced from the gamma ray source by a distance defined as a second spacing. The second spacing and collimation for the second detector are designed so that the gamma rays detected at the second detector will be those that are primarily scattered by the casing and the cement. Finally, a third or far detector is spaced axially farther away from the gamma ray source than both the first and second detectors by a distance defined as a third spacing. The third spacing and collimation defined by the third detector are designed so that the gamma rays detected at the third detector are those primarily scattered from the casing, cement and formation. It is this third detector that enables the tool to measure formation density while the first and second detectors primarily enable the tool to correct for casing and cement. However, the second detector can be used to measure formation density in the absence of cement.

Preferably, the detectors are shielded by a high density material that prevents detection of gamma rays that are simply travelling up through the tool. A pathway or void in the shielding is provided in the form of a collimation channel which extends from the detector through the tool and terminates at the outside surface of the tool. The collimation channels are specifically designed for the purpose of each detector. Specifically, the near or first detector will have a collimation that is aimed at a steep angle with respect to the casing so that the first detector will detect gamma rays that are scattered through all of the casing. The second or middle detector will have a collimation that is directed at a shallower or more perpendicular angle with respect to the casing because the second detector is intended to detect gamma rays scattered through all of the cement as well as the casing. Finally, the third or far detector will have a wide collimation channel which is directed substantially perpendicular to the casing due to the distance of the third detector from the source. Because gamma rays detected at the far detector must pass through the casing, cement, formation before passing back through the cement and casing, the statistical probability of this event happening is smaller than for the first and second detectors and therefore a wider collimation channel is required for the third detector.

It is also anticipated that a high energy gamma ray source such as cobalt 60 which provides 1.173 and 1.333 MeV gamma rays will be utilized. Other gamma ray sources, such as cesium-137 which provides only 0.662 MeV gamma rays or accelerator sources such as an electron accelerator could also be used. However, the spacing between the third or far detector and the gamma ray source will be longer than the conventional spacing between the gamma ray source and far detector in a open hole tool and therefore a source which emits higher energy gamma rays (i.e., 1.173 and 1.333 MeV) will provide a higher intensity at the far detector.

The present invention also lends itself to an improved method of measuring formation density behind casing as well as cement thickness and casing thickness. Specifically, the casing, cement and formation are irradiated with gamma rays. Gamma rays are detected at a first detector spaced a first axial distance from the gamma ray source. A first intensity is calculated for the first detector. Gamma rays are also detected at a second detector disposed a second axial distance from the gamma ray source. The second detector being disposed farther from the source than the first detector. A second intensity is calculated for the second detector. Gamma rays are also detected at a third detector spaced a third axial distance from the gamma ray source. The third detector is spaced farther from the source than both the first and second detectors. A third intensity is calculated for the third detector. An estimated formation density, cement thickness and casing thickness is then calculated based on the first, second and third intensity signals and by assuming constant values for the density and $P_e$ of the casing, negligible values for the $P_e$ of the cement and the $P_e$ of the formation and using a correction factor for the borehole fluid.

It is therefore an object of the present invention to provide an improved formation density tool for use in cased holes.

Another object of the present invention is to provide a logging tool which is capable of measuring formation density while compensating for the effects of casing and cement.

Another object of the present invention is to provide an improved three detector formation density tool.

Another object of the present invention is to provide an improved method for measuring formation density behind casing.

Another object of the present invention is to provide an improved gamma ray density tool capable of measuring cement thickness and casing thickness.

Yet another object of the present invention is to provide an improved formation density tool that may be used in both open and cased holes.

Other features and advances of the present invention will appear in the following description in which one embodiment has been set forth in detail in conjunction with the accompanying drawings.

BRIEF DESCRIPTION OF THE DRAWINGS

This invention is illustrated more or less diagrammatically in the accompanying drawings, wherein.

Figure 1:
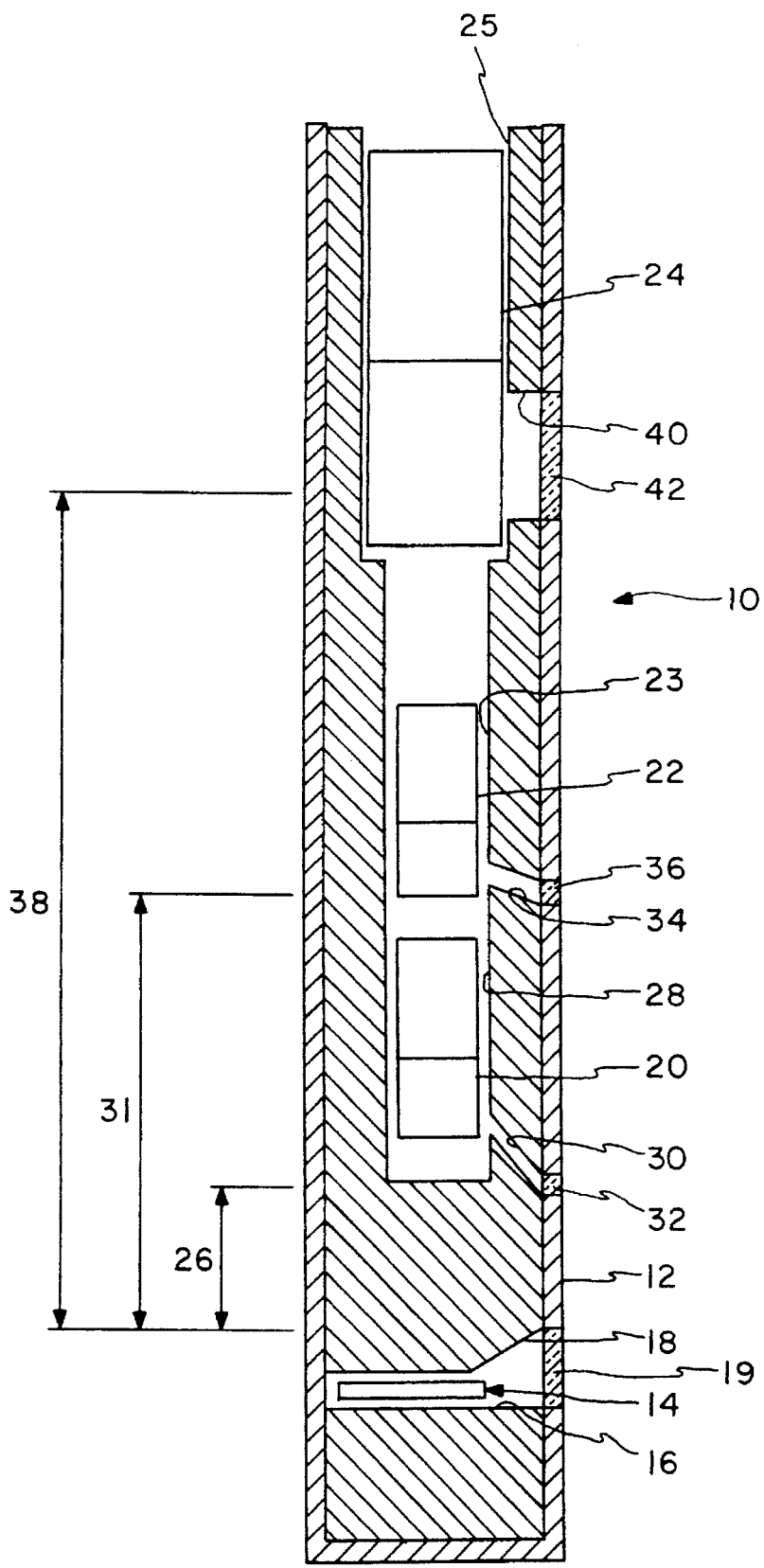
FIG. 1 is a schematic diagram of a formation density tool designed in accordance with the present invention.

It should be understood that the drawings are not to scale and that the embodiments are illustrated by graphic symbols and diagrammatic representations. Details which are not necessary for an understanding of the present invention or which render other details difficult to perceive have been omitted. It should be understood, of course, that the invention is not necessarily limited to the particular embodiments illustrated herein.

DETAILED DESCRIPTION OF THE DRAWINGS

Like reference numerals will be used to refer to like or similar parts from Figure to Figure in the following description of the drawings.

The dramatic improvement contributed by the present invention is best understood after consideration currently-available open hole density tools. Specifically, these tools include only two detectors, a near detector and a far detector. The near detector allows the tool to compensate for mudcake disposed along the periphery of the borehole while the far detector, in combination with the near detector, enables the tool to measure the formation density. These tools are incapable of measuring formation density in a cased hole because two detectors don't generate enough information to compensate for casing and cement and further because the gamma rays do not travel far enough outward from the tool and into the formation before being detected at the far detector. Two-detector open-hole density tools are useful for measuring formation density behind casing only in special situations (e.g. when no cement is present).

Turning to FIG. 1, a three-detector formation density tool 10 is provided. The tool 10 features a housing 12 which may be composed of titanium. Titanium is a suitable material because it is strong and hard, yet has a relatively low density. The low density of titanium is advantageous because it does not absorb as many gamma rays as other high-density materials. Alternatively, steel housings with low density windows disposed immediately in front of the detectors could also be used. If a titanium housing is utilized, low density windows are not necessary. However, the embodiment shown in FIG. 1 is assumed to include low density windows for clarity.

The gamma ray source 14 may be cobalt-60 which produces 1.173 and 1.333 MeV gamma rays. Cesium-137 and accelerator sources may also be utilized. The source 14 is disposed within a source cavity 16. A collimator 18 directs the gamma rays outward in a general direction. Because the tool 10 is normally operated in a decentralized position (see FIG. 2), the end of the collimator 18 or the source window 19 will normally be abutting against the inside surface of the casing during operation of the tool. The source cavity 16 may also be surrounded with a high-density shielding material such as tungsten which helps prevent gamma rays from proceeding directly upward toward the detectors 20, 22, 24.

The first or near detector 20 is disposed from the source 14 by a pre-determined distance referred to as the first spacing 26. The first detector 20 is accommodated in a compartment 28 that may be surrounded by a high-density material, such as tungsten. A collimation channel 30 serves as a passageway between the detector 20 and the housing 12. A low density window 32 may also be provided. The combination of the collimation channel 30 and window 32 and the specific angle of the collimation channel 30 enables gamma rays that have been scattered by the casing to reach the first detector 20.

In contrast, the second detector 22 is disposed axially from the source 14 by a second spacing 31. A second detector 22 is also contained within a compartment 23 that may be surrounded with a high-density material such as tungsten which defines a collimation channel 34 that extends between the outer surface of the housing 12 and the second detector 22. The second collimation channel 34 terminates at a second window 36. The second window 36 and second collimation channel 34 permit gamma rays that are scattered primarily by the cement and the casing to proceed up through the channel 34 to the second detector 22. Therefore, the second detector 22 preferentially detects gamma rays that are emitted from the source 14 and then subsequently passed through the casing and cement before they proceed up the channel 34 to the second detector 24.

The third detector 24 is disposed yet even farther than the second detector 22 at a third spacing 38 above the source 14. It will be noted that the third detector 24 may also be encased in a compartment 25 which is layered with a high-density material which defines a collimation channel 40. The collimation channel 40 and window 42 that are substantially wider than the second collimation channel 34 and second window 36 as well as the first collimation channel 30 and first window 32. This is because the third or far detector 26 is intended to detect gamma rays being scattered by the formation and to block those gamma rays that travel a significant distance through the borehole. The width of the collimation channel 40 is necessary to collect a reasonable number of gamma rays.

While the tool 10 of FIG. 1 utilizes three detectors 20, 22, 24 that are disposed above the source 14, it will be recognized that the detectors 20, 22, 24 could easily be disposed below the source 14 and still fall within the scope of the present invention.

Figure 2:
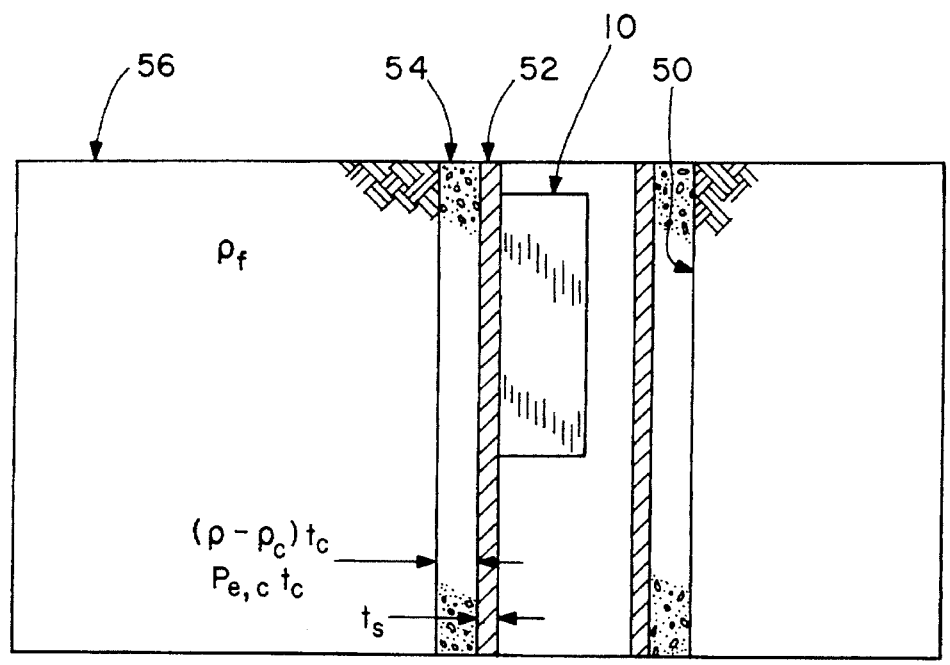
FIG. 2 is a general illustration of a formation density tool showing a tool in a decentralized position within a cased borehole.

Turning to FIG. 2, a schematic diagram of the tool 10 in use is provided. The tool 10 is normally lowered to the bottom of the borehole 50 and pulled upward by a wire line. The wire line also transmits signals from the tool so that the formation density ($\rho_f$), cement thickness ($t_c$) and casing thickness ($t_s$) can be calculated as the tool 10 is pulled upward towards the surface. The tool 10 could also be designed to operate as the tool is being lowered downhole. The borehole 50 includes casing 52 having a thickness ($t_s$); the casing 52 is set within the borehole with cement 54 having a thickness ($t_c$); and the formation 56 has a density ($\rho_f$), all of which can be measured by the tool 10.

The distances between the first detector 20, the second detector 22 and the third detector 24 and the source 14 and geometries of the collimators 30, 34, 40 must be designed so that the detector responses have different sensitivities to the formation, casing and cement. Tables 1 and 2 show the ratio of the cement sensitivity to the casing sensitivity for various detector spacings. Table 1 deals with cement thicknesses ranging from 0.5 to 1.0 inches; Table 2 deals with cement thicknesses ranging from 1.0 to 1.5 inches. The ratio is presented for three different energy ranges and for the total count rates or intensities. Note that in Table 1 (smaller cement thicknesses) there is no significant change in the ratio for spacings greater than 16.25 inches, i.e. the 16.25 inch and 21.50 inch ratios are about the same. The Widest range in the ratio sensitivities (using the spacings and collimation provided) is obtained from two extreme spacings and one in the middle. Thus, the 4.5-inch, 8.5-inch and 16.25-inch spacings should be close to the optimum spacings required for cements less than 1-inch thick. On the other hand, Table 2 (larger cement thicknesses) shows that the 21.50-inch ratio is significantly different than the 16.25-inch ratio. Thus, longer detector spacings may be desired if the tool is to log through cements thicker than 1-inch- The detectors used are commercially available sodium iodide crystal detectors with photomultiplier tubes.

TABLE 1

Ratio of cement sensitivity
to casing sensitivity for different
detector spacings and energy ranges. The cement sensitivity
was determined from changes in the count rate observed when
replacing the 1.0-inch-thick cement piece with the 0.5-inch-thick
cement piece. The casing sensitivity was determined by replacing
the 0.36-inch casing with the 0.50-inch casing. The ratio of
sensitivities is merely the ratio of the difference in logarithms
of the count rates obtained before and after the substitutions

| Spacing (Inches) | Block | Window 1 (Low Energy) | Window 2 (Med. Energy) | Window 3 (High Energy) | Window 4 (Total) |
|---|---|---|---|---|---|
| 4.50 | Marble | .369 | .484 | .378 | .410 |
| 4.50 | Fused Silica | .108 | .193 | .046 | .129 |
| 6.25 | Marble | .586 | .673 | .572 | .613 |
| 6.25 | Fused Silica | .228 | .242 | −.079 | .172 |
| 8.50 | Marble | .724 | .837 | .882 | .810 |
| 8.50 | Fused Silica | .266 | .361 | .369 | .324 |
| 14.50 | Marble | 1.106 | 1.303 | 1.272 | 1.224 |
| 14.50 | Fused | .514 | .702 | .794 | .651 |

TABLE 1-continued

Ratio of cement sensitivity
to casing sensitivity for different
detector spacings and energy ranges. The cement sensitivity
was determined from changes in the count rate observed when
replacing the 1.0-inch-thick cement piece with the 0.5-inch-thick
cement piece. The casing sensitivity was determined by replacing
the 0.36-inch casing with the 0.50-inch casing. The ratio of
sensitivities is merely the ratio of the difference in logarithms
of the count rates obtained before and after the substitutions

| Spacing (Inches) | Block | Window 1 (Low Energy) | Window 2 (Med. Energy) | Window 3 (High Energy) | Window 4 (Total) |
|---|---|---|---|---|---|
| 16.25 | Marble | 1.273 | 1.620 | 1.697 | 1.528 |
| 16.25 | Fused Silica | .434 | .559 | .556 | .515 |
| 21.50 | Marble | 1.500 | 1.707 | 1.529 | 1.574 |
| 21.50 | Fused Silica | .613 | .766 | .769 | .709 |

TABLE 2

Ratio of cement sensitivity
to casing sensitivity for different
detector spacings and energy ranges. The cement sensitivity
was determined from changes in the count rate observed when
replacing the 1.0-inch-thick cement piece with the 1.5-inch-thick
cement piece. The casing sensitivity was determined by replacing
the 0.36-inch casing with the 0.50-inch casing. The ratio of
sensitivities is merely the ratio of the difference in logarithms
of the count rates obtained before and after the substitutions

| Spacing (Inches) | Block | Window 1 (Low Energy) | Window 2 (Med. Energy) | Window 3 (High Energy) | Window 4 (Total) |
|---|---|---|---|---|---|
| 4.50 | Marble | .067 | .010 | .401 | .140 |
| 4.50 | Fused Silica | −.037 | −.080 | .265 | .011 |
| 6.25 | Marble | −.033 | −.090 | .129 | −.012 |
| 6.25 | Fused Silica | −.181 | −.263 | −.269 | −.230 |
| 8.50 | Marble | −.299 | −.352 | −.283 | −.311 |
| 8.50 | Fused Silica | −.193 | −.247 | −.263 | −.229 |
| 14.50 | Marble | −.539 | −.652 | −.609 | −.599 |
| 14.50 | Fused Silica | −.459 | −.613 | −.708 | −.577 |
| 16.25 | Marble | −.620 | −.796 | −.786 | −.737 |
| 16.25 | Fused Silica | −.550 | −.792 | −.948 | −.748 |
| 21.50 | Marble | −.877 | −1.076 | −.995 | −.976 |
| 21.50 | Fused Silica | −.496 | −.610 | −.686 | −.589 |

Figure 3:
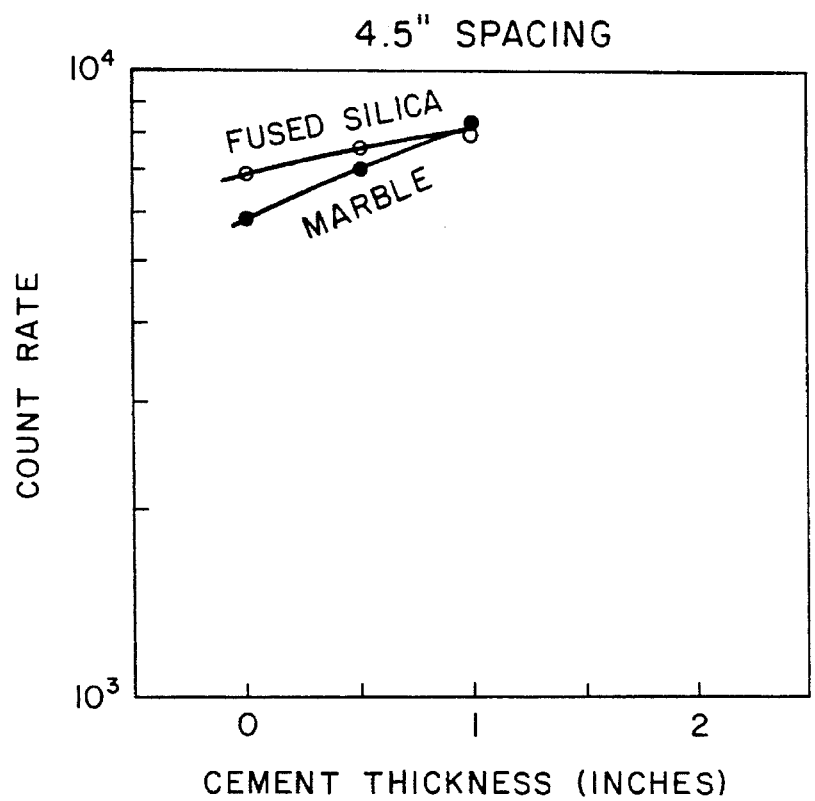
FIG. 3 is a graphical illustration of the dependence of count rate or intensity on cement thickness for a source-to-detector spacing of 4.5 inches.
Figure 4:
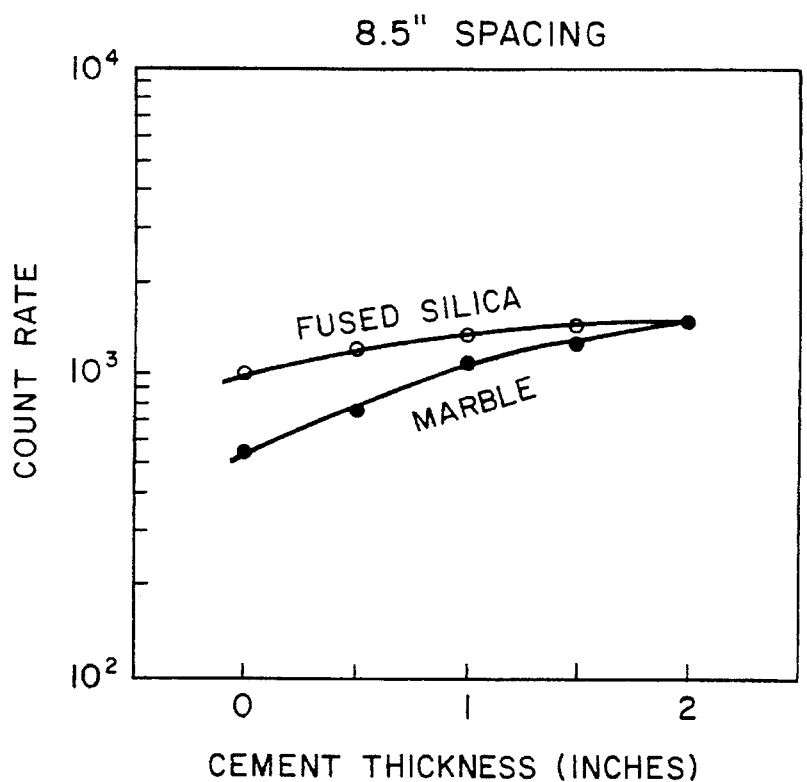
FIG. 4 is a graphical illustration of the dependence of count rate or intensity on cement thickness for a source-to-detector spacing of 8.5 inches.
Figure 5:
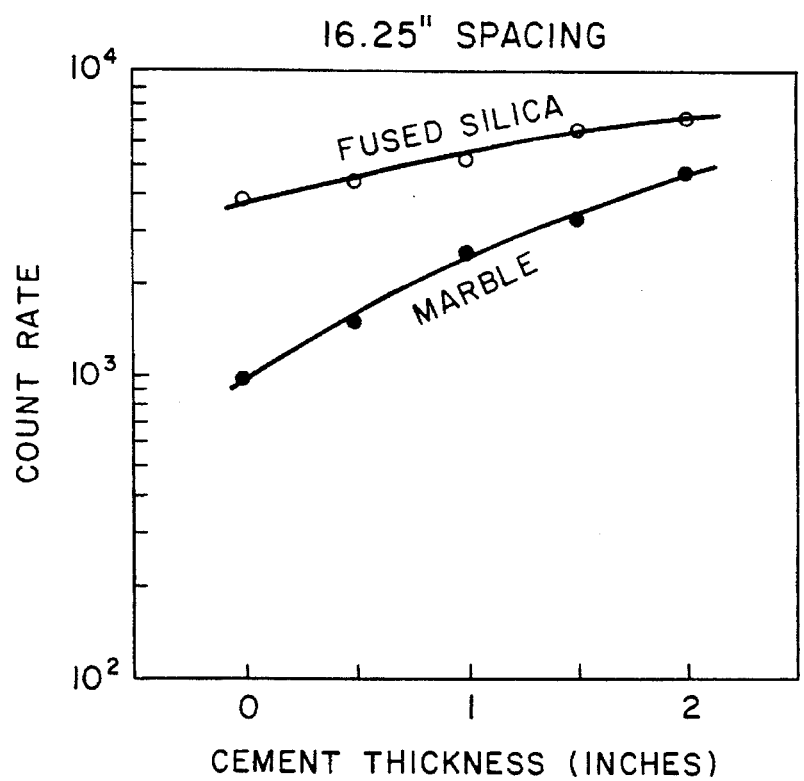
FIG. 5 is a graphical illustration of the dependence of count rate or intensity on cement thickness for a source-to-detector spacing of 16.25 inches.

FIGS. 3, 4 and 5 illustrate the dependence of count rate or intensity on the cement thickness for three different source-to-detector spacings, namely 4.5 inches, 8.5 inches and 16.25 inches. Marble and fused silica are used to simulate formations because the densities of the two materials span the density range that will normally be encountered. As illustrated in Tables 1 and 2 above, the 4.5-inch spacing is most sensitive to the casing relative to the cement while the 16.25-inch spacing is the least sensitive to the casing relative to the cement. In the anticipated design, the nearest detector will provide the primary information about the casing, the middle detector will provide the primary information about the cement, and the far detector will provide the primary information about the formation. Thus, the amount of cement that the tool will be able to handle will be determined by the middle detector.

It will also be understood that the signals generated at each detector 20, 22, 24 could be divided up into various energy or "spectral" windows. For example, the gamma rays reaching the any one of the detectors could be classified by its energy level and instead of one signal being generated per detector 20, 22, 24, anywhere from two signals to several signals could be generated per detector depending upon the number of windows per detector. Energy windows are useful in analyzing lithology, providing more accurate mudcake correction and correcting tool variances due to temperature changes. In the case of temperature stabilization, a small calibration source that emits gamma rays outside of the energy range or window of the gamma rays generated by the tool's main source is disposed adjacent to or directly on the detector. If the signal generated by the detector for the calibration source gamma rays fluctuates or drifts as the temperature of the tool changes, then the tool can compensate change in signal due to temperature and the signals generated for the other energy windows will be corrected as well.

Although only one specific configuration of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

What is claimed:

1. A tool for measuring the density of a formation surrounding a borehole, the tool comprising:

a housing, the housing accommodating a gamma ray source, at least three detectors including a first detector, a second detector and a third detector;

the first detector spaced axially from the gamma ray source, the distance between the first detector and the gamma ray source is defined as a first spacing, the first detector detecting intensities of the gamma rays that engage the first detector, the first detector also generating a first signal that is proportional to the intensities of the gamma rays detected by the first detector, the first detector is shielded by a first high density material for substantially blocking transmission of gamma rays travelling upward through the tool and through the borehole to the first detector, a first collimation channel in the first high density material extending from the first detector to an outer surface of the housing, the first collimation channel having a first width and being directed outward from the first detector at a first angle with respect to horizontal and toward to the source;

a second detector spaced axially from the first detector and the gamma ray source, the distance between the second detector and the gamma ray source is defined as a second spacing, the second detector detecting intensities of the gamma rays that engage the second detector, the second detector also generating a second signal that is proportional to the intensities of the gamma rays detected by the second detector, a second collimation channel extends from the second detector to the outer surface of the housing, the second collimation channel having a second width and being directed outward from the second detector at a second angle with respect to horizontal and toward the source, the second angle being smaller than the first angle, the second width being larger than the first width; and a third detector spaced axially from the first and second detectors and the gamma ray source, the distance between the third detector and the gamma ray source is defined as a third spacing, the third spacing is from about 13 inches to about 19 inches, the third detector detecting intensities of the gamma rays that engage the third detector, the third detector also generating a third signal that is proportional to the intensities of the gamma rays detected by the third detector, a third collimation channel extends from the third detector to the outer surface of the housing, the third collimation channel having a third width and being directed outward from the third detector at a third angle with respect to horizontal, the third angle being less than the second angle, the third width being greater than the second width; and means for calculating the density of the formation from the first, second and third signals.

2. The tool of claim 1, wherein the first spacing is from about 3 inches to about 6 inches.

3. The tool of claim 2, wherein the second spacing is from about 6 inches to about 11 inches.

4. The tool of claim 3, wherein the third spacing is from about 13 inches to about 19 inches.

5. A tool for measuring the density of a formation surrounding a borehole that has been lined with casing, cement is disposed between the casing and the borehole, the tool comprising:

a housing for enclosing the tool and protecting the tool from the environment, the housing accommodating a gamma ray source, a first detector spaced axially from the gamma ray source by a first spacing distance, a second detector spaced axially from the gamma ray source by a second spacing distance and a third detector spaced axially from the gamma ray source by a third spacing distance;

the first detector is shielded by a first high density material for substantially blocking transmission of gamma rays emitted from the gamma ray source to the first detector, a first collimation channel in the first high density material extending from the first detector to an outer surface of the housing, the first collimation channel permitting gamma rays scattered primarily from the casing to reach the first detector, the first detector generating a first signal that is proportional to the intensity of the gamma rays reaching the first detector;

a second detector disposed farther from the source than the first detector, a second collimation channel extends from the second detector to the outer surface of the housing, the second collimation channel permitting gamma rays scattered primarily from the casing and the cement to reach the second detector, the second detector generating a second signal that is proportional to the intensity of the gamma rays reaching the second detector;

a third detector disposed farther from the source than the first and second detectors, a third collimation channel extends from the third detector to the outer surface of the housing, the third collimation channel permitting gamma rays scattered primarily from the casing, cement and formation to reach the third detector, the third detector generating a third signal that is proportional to the intensity of the gamma rays reaching the third detector;

the first, second and third collimation channels are in substantial alignment along the outer surface of the housing, the housing is decentralized within the borehole so that the first, second and third collimation channels are in abutting engagement with an inside surface of the casing; and means for generating the density of the formation, the thickness of the cement and the thickness of the casing from the first, second and third signals.

6. The tool of claim 5, wherein the first spacing is from about 3 inches to about 6 inches.

7. The tool of claim 6, wherein the second spacing is from about 6 inches to about 11 inches.

8. The tool of claim 7, wherein the third spacing is from about 13 inches to about 19 inches.

9. The tool of claim 5, wherein a source collimation channel extends from the gamma ray source to the outer surface of the housing, the source collimation channel is in substantial alignment with the first, second and third collimation channels.

10. The tool of claim 5, wherein the gamma ray source is cobalt-60.

11. The tool of claim 5, wherein the gamma ray source is cesium-137.

12. The tool of claim 5, wherein the gamma ray source is an electron accelerator.

13. A tool for measuring the density of a formation surrounding a borehole that has been lined with casing, cement is disposed between the casing and the borehole, the tool comprising:

the first detection means spaced axially from the gamma ray emission means, the distance between the first detection means and the gamma ray emission means is defined as a first spacing, the first detection means primarily detecting gamma rays scattered from the casing, the first detection means generating a first signal that is proportional to the intensity of gamma rays detected by the first detector;

a second detection means spaced axially farther from the gamma ray emission means than the first detection means, the distance between the second detection means and the gamma ray emission means is defined as a second spacing, the second detection means primarily detecting gamma rays scattered from the casing and the cement, the second detection means generating a second signal that is proportional to the intensity of gamma rays detected by the second detector;

a third detection means spaced axially farther from the gamma ray emission means than both the first and second detection means, the distance between the third detection means and the gamma ray emission means is defined as a third spacing, the third detection means primarily detecting gamma rays scattered from the casing, cement and formation, the third detection means generating a third signal that is proportional to the intensity of gamma rays detected by the third detector; and means for calculating the formation density from the first, second and third signals.

14. A method of measuring the density of a formation surrounding a borehole that has been lined with casing, cement is disposed between the casing and the borehole, the method comprising the following steps:

irradiating the casing, cement and formation with gamma rays emitted from a gamma ray source;

detecting gamma rays scattered primarily from the casing at a first spaced distance above the gamma ray source;

calculating a first signal at the first spaced distance;

detecting gamma rays scattered primarily from the casing and cement at a second spaced distance above the gamma ray source, the second spaced distance being above the first spaced distance;

calculating a second signal at the second spaced distance;

detecting gamma rays scattered primarily from the casing, cement and formation at a third spaced distance above the gamma ray source, the third spaced distance being above the second spaced distance;

calculating a third signal at the third spaced distance;

calculating an estimated formation density from the first, second and third signals and by assuming constant values for the density and $P_e$ of the casing, by assuming negligible values for the $P_e$ of the cement and the $P_e$ of the formation, and by using a correction for the borehole fluid.

15. A tool for measuring the density of a formation surrounding a borehole, the tool comprising:

a housing, the housing accommodating a gamma ray source, at least three detectors including a first detector, a second detector and a third detector;

the first detector spaced axially from the gamma ray source, the distance between the first detector and the gamma ray source is defined as a first spacing, the first detector detecting intensities of the gamma rays that engage the first detector, the first detector also generating a first signal that is proportional to the intensities of the gamma rays detected by the first detector;

a second detector spaced axially from the first detector and the gamma ray source, the distance between the second detector and the gamma ray source is defined as a second spacing, the second detector detecting intensities of the gamma rays that engage the second detector, the second detector also generating a second signal that is proportional to the intensities of the gamma rays detected by the second detector; and a third detector spaced axially from the first and second detectors and the gamma ray source, the distance between the third detector and the gamma ray source is defined as a third spacing, the third detector detecting intensities of the gamma rays that engage the third detector, the third detector also generating a third signal that is proportional to the intensities of the gamma rays detected by the third detector;

means for calculating the density of the formation from the first, second and third signals; and means for calculating a cement thickness from the first, second and third signals.

16. A tool for measuring the density of a formation surrounding a borehole, the tool comprising:

a housing, the housing accommodating a gamma ray source, at least three detectors including a first detector, a second detector and a third detector;

the first detector spaced axially from the gamma ray source, the distance between the first detector and the gamma ray source is defined as a first spacing, the first detector detecting intensities of the gamma rays that engage the first detector, the first detector also generating a first signal that is proportional to the intensities of the gamma rays detected by the first detector;

a second detector spaced axially from the first detector and the gamma ray source, the distance between the second detector and the gamma ray source is defined as a second spacing, the second detector detecting intensities of the gamma rays that engage the second detector, the second detector also generating a second signal that is proportional to the intensities of the gamma rays detected by the second detector; and a third detector spaced axially from the first and second detectors and the gamma ray source, the distance between the third detector and the gamma ray source is defined as a third spacing, the third detector detecting intensities of the gamma rays that engage the third detector, the third detector also generating a third signal that is proportional to the intensities of the gamma rays detected by the third detector;

means for calculating the density of the formation from the first, second and third signals; and means for calculating a casing thickness from the first, second and third signals.

* * * * *